United States Patent
Gordon et al.

(10) Patent No.: US 9,891,083 B2
(45) Date of Patent: Feb. 13, 2018

(54) PROBE TIP FOR AIR DATA PROBE

(71) Applicant: Honeywell International Inc., Morris Plains, NJ (US)

(72) Inventors: Grant A. Gordon, Peoria, AZ (US); Yates Wong, Humboldt, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/991,251

(22) Filed: Jan. 8, 2016

(65) Prior Publication Data
US 2017/0199063 A1 Jul. 13, 2017

(51) Int. Cl.
*G01F 1/46* (2006.01)

(52) U.S. Cl.
CPC .................................... *G01F 1/46* (2013.01)

(58) Field of Classification Search
None
See application file for complete search history.

(56) References Cited

U.S. PATENT DOCUMENTS

| | | | |
|---|---|---|---|
| 2,254,155 A | 8/1941 | Reichel | |
| 2,510,986 A | 6/1950 | Larkin | |
| 2,984,107 A | 5/1961 | Strieby et al. | |
| 3,030,807 A | 4/1962 | Scadron | |
| 3,400,583 A | 9/1968 | Newport et al. | |
| 3,535,930 A | 10/1970 | Rees | |
| 3,646,811 A | 3/1972 | DeLeo et al. | |
| 4,378,697 A | 4/1983 | DeLeo et al. | |
| 4,836,019 A | 6/1989 | Hagen et al. | |
| 5,046,360 A | 9/1991 | Hedberg | |
| 5,337,602 A | 8/1994 | Gibson | |
| 5,442,958 A | 8/1995 | Hagen | |
| 5,543,183 A | 8/1996 | Streckert et al. | |
| 5,601,254 A * | 2/1997 | Ortiz | G01F 1/46 244/1 R |
| 5,616,861 A | 4/1997 | Hagen | |
| 6,070,475 A * | 6/2000 | Muehlhauser | G01F 1/46 374/E13.006 |
| 6,134,972 A | 10/2000 | Streckert et al. | |
| 6,191,528 B1 | 2/2001 | Iwamura et al. | |
| 6,543,298 B2 | 4/2003 | Cronin et al. | |

(Continued)

FOREIGN PATENT DOCUMENTS

| | | |
|---|---|---|
| CA | 2745138 | 1/2012 |
| EP | 2586548 | 5/2013 |

(Continued)

OTHER PUBLICATIONS

U.S. Patent and Trademark Office, "Notice of Allowability", "U.S. Appl. No. 14/830,943", dated Mar. 1, 2017, pp. 1-6.

(Continued)

*Primary Examiner* — Harshad R Patel
(74) *Attorney, Agent, or Firm* — Fogg & Powers LLC

(57) ABSTRACT

A probe assembly includes a heat source; and a probe tip configured to enhance conduction of heat provided by the heat source into a front end tip of the probe. The probe tip includes: a first region having high thermal conductivity in at least a z-direction, wherein the z-direction is parallel to an axis along which the probe tip is extended; and at least one additional region having thermal characteristics different from the first region.

12 Claims, 5 Drawing Sheets

(56) References Cited

U.S. PATENT DOCUMENTS

| | | | |
|---|---|---|---|
| 6,957,586 | B2 | 10/2005 | Sprague |
| 9,116,162 | B2 | 8/2015 | Leblond et al. |
| 2004/0093953 | A1 | 5/2004 | Gilkison et al. |
| 2004/0244477 | A1* | 12/2004 | Zippold .................. G01F 1/46 |
| | | | 73/204.11 |
| 2012/0150038 | A1 | 6/2012 | Osawa |
| 2014/0163717 | A1 | 6/2014 | Das et al. |
| 2015/0064047 | A1 | 3/2015 | Hyde et al. |
| 2017/0052046 | A1 | 2/2017 | Gordon et al. |
| 2017/0101190 | A1 | 4/2017 | Anderson et al. |
| 2017/0115139 | A1* | 4/2017 | Wong .................. G01D 11/245 |

FOREIGN PATENT DOCUMENTS

| | | |
|---|---|---|
| EP | 2801806 | 11/2014 |
| FR | 861520 | 11/1941 |
| FR | 882708 | 6/1943 |
| FR | 1439443 | 5/1966 |
| FR | 1472440 | 3/1967 |
| WO | 9205414 | 4/1992 |
| WO | 2014061158 | 4/2014 |
| WO | 2014105245 | 7/2014 |
| WO | 2015022527 | 2/2015 |

OTHER PUBLICATIONS

European Patent Office, "Extended European Search Report for EP Application No. 16192297.6", "Foreign Counterpart to U.S. Appl. No. 14/878,650", dated May 3, 2017, pp. 18, Published in: EP.

United States Patent and Trademark Office, "Office Action", "From U.S. Appl. No. 14/878,650", dated Mar. 17, 2017, pp. 1-18, Published in: US.

European Patent Office, "Extended European Search Report from EP Application No. 16184411.3 dated Dec. 20, 2016", "from Foreign Counterpart of U.S. Appl. No. 14/830,943", dated Dec. 20, 2016, pp. 1-8, Published in: EP.

U.S. Patent and Trademark Office, "Notice of Allowance", "U.S. Appl. No. 14/830,943", dated Jan. 30, 2017, pp. 1-12, Published in: US.

European Patent Office, "Extended European Search Report from EP Application No. 16204902.7 dated Mar. 6, 2017", "from Foreign Counterpart of U.S. Appl. No. 14/991,251", dated Mar. 6, 2017, pp. 1-9, Published in: EP.

U.S. Patent and Trademark Office, "Restriction Requirement", "U.S. Appl. No. 14/830,943", dated Nov. 1, 2016, pp. 1-6, Published in: US.

Gordon et al., "Systems and Methods for Additive Manufacturing for Air Data Probes", "U.S. Appl. No. 14/830,943, filed Aug. 20, 2015", dated Aug. 20, 2015, pp. 1-21, Published in: US.

Ramirez et al., "Novel Precipitate-Microstructural Architecture Developed in the Fabrication of Solid Copper Components by Additive Manufacturing Using Electron Beam Melting", "Science Direct", dated Apr. 2, 2011, pp. 4088-4099, Publisher: Elsevier, Published in: US.

* cited by examiner

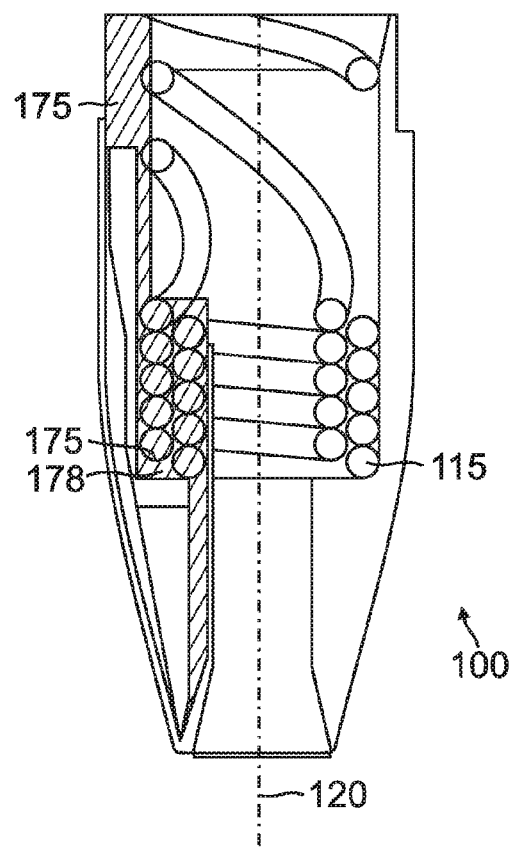
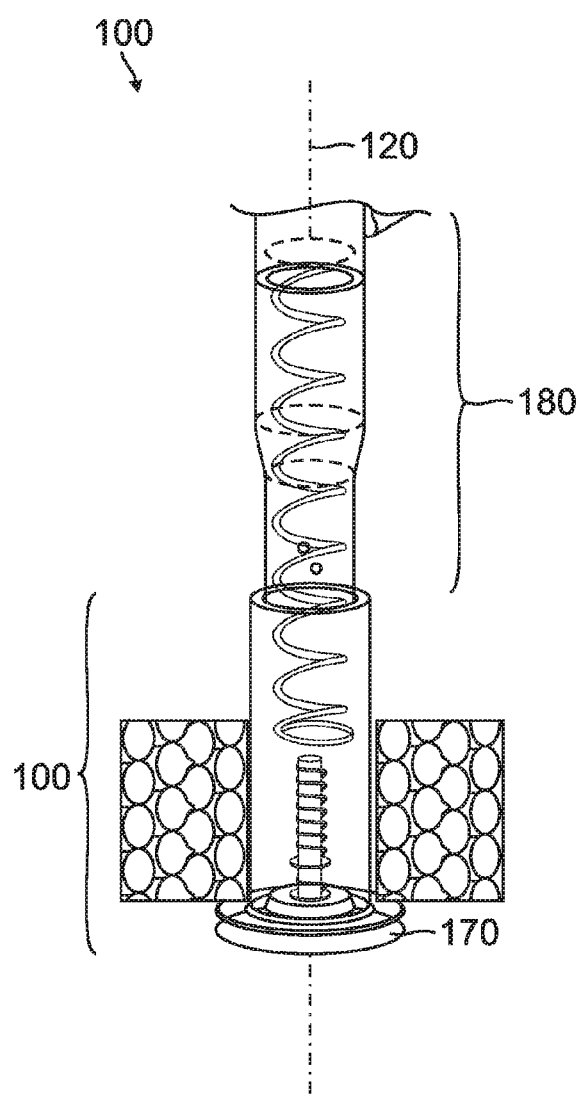
FIG. 3B
FIG. 3A

PROBE TIP FOR AIR DATA PROBE

BACKGROUND

Pitot probes measure fluid flow velocity. Pitot probes or pitot static probes are often used to determine an aircraft's airspeed. Probe tip of pitot probes or pitot static probes include an inlet hole essential for measurement of pressure.

SUMMARY

A probe assembly includes a heat source; and a probe tip configured to enhance conduction of heat provided by the heat source into a front end tip of the probe. The probe tip includes: a first region having high thermal conductivity in at least a z-direction, wherein the z-direction is parallel to an axis along which the probe tip is extended; and at least one additional region having thermal characteristics different from the first region.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 3A-3B illustrate an exemplary process of rapid restoration or replacement of a probe tip according to one embodiment of the present disclosure.

Figure 1A:
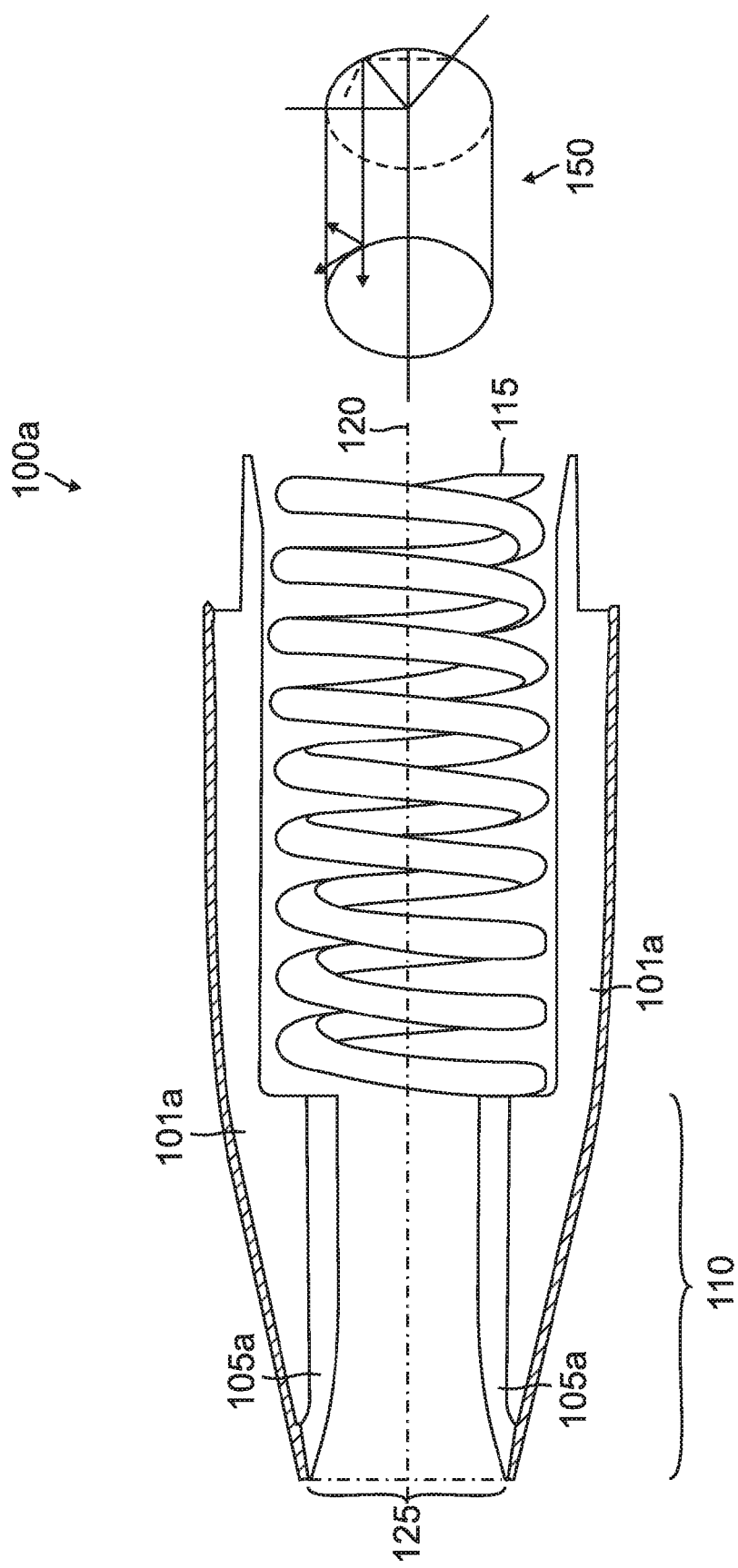
FIG. 1A is a cross sectional view of an exemplary probe tip included in a probe assembly according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In some systems, a pitot probe is used to facilitate the determination of the airspeed of an aircraft. To determine the fluid flow velocity, a tube is placed into a fluid such that an inlet hole of the probe points directly into the flowing fluid. This fluid can be a media such as air or liquid. The pitot tube delivers pressure pneumatically to a pressure sensor that measures the pressure due to the flowing fluid entering through the inlet hole. Pitot tubes commonly have heating elements to prevent the tube from becoming clogged with ice. The ability of these probes to meet these anti-icing and de-icing requirements are the subject of a number of regulations by the Department of Transportation and Federal Aviation Administration including the airworthiness standards addressing super-cooled large drop icing conditions, mixed phase and ice crystal icing conditions.

The probe tip area of pitot probes or pitot static probes significantly impacts the accuracy of total pressure measurements at angles of attack greater than zero. Because a sharp leading edge at the inlet hole of the probe aids in accurate measurement of air pressure at various angles of attack and these leading edges are subject to icing, it is critical to drive heat into the foremost regions (i.e. probe tip) of the probe in order to meet these de-icing and anti-icing requirements. Increasing the power applied to the heater may not be an effective way to achieve this objective as it can result in overheating in certain areas of the probe and can significantly increase the risk of premature failure of the probe due to high levels of heat generated. For the reasons stated above and for other reasons stated below, it will become apparent to those skilled in the art upon reading and understanding the specification, there is a need in the art for improved systems and methods for a probe that manages the heat input efficiently to conserve power and to meet the anti-icing and de-icing requirements while maintaining the performance of the probe.

Embodiments described herein provide for a probe assembly with a probe tip that allows the heat input from probe heat source to move into a front end tip area. Embodiments provided herein are applicable to a pitot probes and other air data probes where deicing and anti-icing design requirements can benefit from the ability to preferentially move the heat input from one region to another. The probe tip includes one or more regions, wherein each region has a respective thermal behavior. In exemplary embodiments, this thermal behavior is a characteristic of the material in this region. The probe tip is designed to have anisotropic thermal material properties. For example, the probe tip could have greater thermal conductivity in one direction while acting as an insulator in another direction. In example embodiments, the probe tip is designed such that the probe tip has thermal conductivity in one direction greater than thermal conductivity in perpendicular directions.

In some embodiments, the probe tip is replaceable. In some embodiments, a replaceable probe tip is an insert module. In some embodiments, the replaceable probe tip is replaced or installed through a dedicated induction brazing work cell. In some embodiments, the replaceable probe tip is mechanically attached.

Figure 1B:
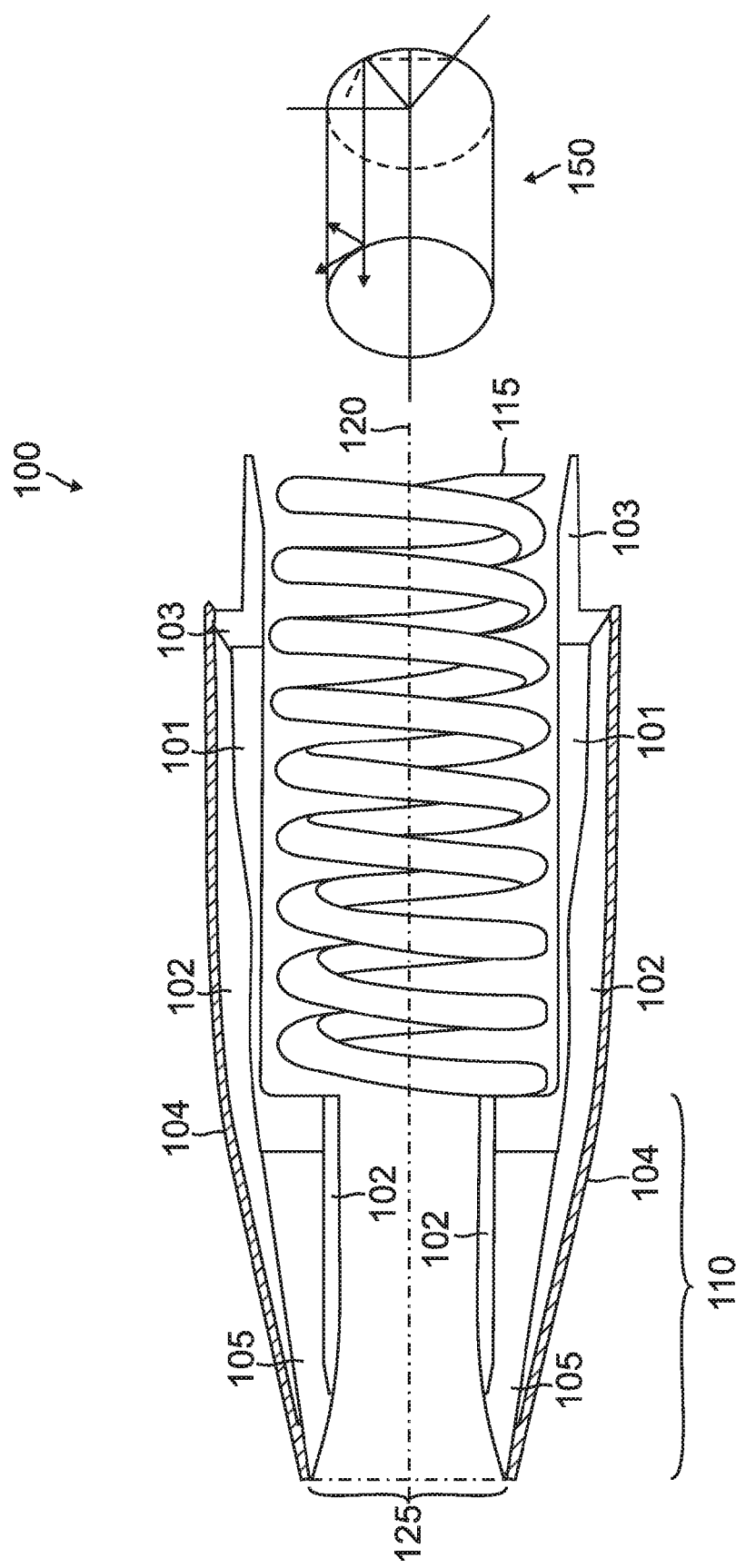
FIG. 1B is a cross sectional view of another exemplary probe tip included in a probe assembly according to one embodiment of the present disclosure.

FIGS. 1A-1B are cross sectional views of exemplary probe tips 100a and 100 included in a pitot probe. Probe tips 100a and 100 extend cylindrically around z-axis 120 on an outer side of a heat source 115. Heat is provided to probe tips 100a and 100 via the heat source 115 included in the pitot probe. As shown in FIGS. 1A-1B, in exemplary embodiments, heat source 115 is a heating coil. In exemplary embodiments, heating coil 115 is wrapped surrounding a hollow cylindrical center 125 (such as inlet hole of the probe). In the examples shown in FIG. 1A-1B, this heat is provided through heating coil 115 extended through the hollow cylindrical center 125. However, in some embodiments, another heat source could be provided. The heating coil 115 could be a double wrapped heating wire, a double helical coil or any other heating coil suitable for heating needs of the pitot probe. Heating coil 115 has to maintain a minimum radial coverage, and in some examples could fail prematurely in service if made too tight. For this reason, heating coil 115 does not extend to front end tip area 110 of the probe tip.

As shown in FIG. 1A, probe tip 100*a* is configured to include at least two regions 101*a* and 105*a* with different material behavior to direct the heat provided by heating coil 115 to front end tip area 110. In exemplary embodiments, regions 101*a* and 105*a* extend 360 degrees around the z-axis 120 and are axially symmetric. In the example shown in FIG. 1A, each region has different thermal material properties. In exemplary embodiments, regions 101*a* and 105*a* are configured such that thermal conductivity of the probe tip in the z-direction is greater than thermal conductivity in radial direction r and tangential direction θ. In the examples of FIG. 1A-1B, the thermal conductivity of these regions is defined using a radial (r, θ, z) coordinate system 150, and z-direction is parallel to the z-axis 120 along which probe tip 100*a* is extended.

In the example shown in FIG. 1A, region 105*a* is included in front end tip area 110. Region 101*a* is adjacent to region 105*a*. Region 105*a* is configured to have thermal conductivity at least in the z-direction. In exemplary embodiments, region 101*a* is configured to function as an insulator with isotropic properties. In such an example, the heat provided by heating coil 115 is directed in the z-direction through region 105*a* which has high thermal conductivity in at least a z-direction.

In exemplary embodiments, at least one of the at least two regions 101*a* and 105*a* included in probe tip 100*a* is formed through the process of additive manufacturing (such as electron beam melting (EBM), direct metal laser sintering (DMLS), etc.). In exemplary embodiments, through knowledge of the properties of grain growth and grain orientation of certain materials, probe tip 100*a* is fabricated with specific designed-in features that produce different thermal characteristics to enhance the flow of heat from the heat source 115 to the probe tip area 110.

In exemplary embodiments, a single material can be used to fabricate multiple regions of the at least two regions included in probe tip 100*a* through the process of additive manufacturing by providing an anisotropic microstructure. For example, by growing or depositing a single material with a preferred grain growth and orientation across multiple grains, both regions 101*a* and 105*a* are fabricated such that 105*a* is configured to have a first thermal characteristic (such as conductivity in at least the z-direction) whereas 101*a* is configured to have a characteristic different from that of region 105*a* (such as functioning as an insulator). In exemplary embodiments, two different materials can be used to fabricate multiple regions of the at least two regions included in probe tip 100*a* through the process of additive manufacturing. For example, by growing or depositing a first material with a preferred grain growth and orientation across multiple grains region 105*a* is configured to have a first thermal characteristic (such as high conductivity in at least the z-direction), and by growing or depositing a second material with a preferred grain growth and orientation across multiple grains region 101*a* is configured to have a characteristic different from that of region 105*a* (such as functioning as an insulator).

In exemplary embodiments, at least one of the at least two regions 101*a* and 105*a* included in probe tip 100*a* is formed using different materials through subtractive manufacturing such that the material inherently has thermal characteristics as desired by probe tip 100 to enhance the heat conducted in front end tip area 110. In exemplary embodiments, each region of the at least two regions 101*a* and 105*a* is fabricated from a different material using the process of subtractive manufacturing. In such an example, region 105*a* can be fabricated from a copper alloy to have a high thermal conductivity at least in the z-direction, whereas region 101*a* can be fabricated from an insulating material.

Figure 2A:
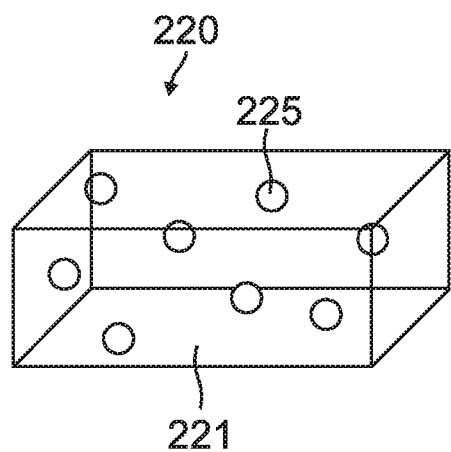
FIGS. 2A-2B illustrate examples of voids included in an exemplary probe tip of a probe according to one embodiment of the present disclosure.

In exemplary embodiments, at least one of the regions of the at least two regions 101*a* and 105*a* are fabricated using a single highly conductive material (such as copper alloy or nickel alloy) is used to fabricate probe tip 100. In exemplary embodiments, voids are introduced in the conductive material to create a strong insulator or to direct heat received from heat source 115 in a desired direction. In one example of such an embodiment, a strong insulator (for example, region 101*a*) is fabricated by introducing voids in a uniformly built material (see FIG. 2A). As shown in FIG. 2A, voids 225 are introduced in material 221 to fabricate an insulating material 220. In exemplary embodiments, these voids can be introduced in the highly conductive material used for fabrication through the process of additive manufacturing.

Figure 2B:
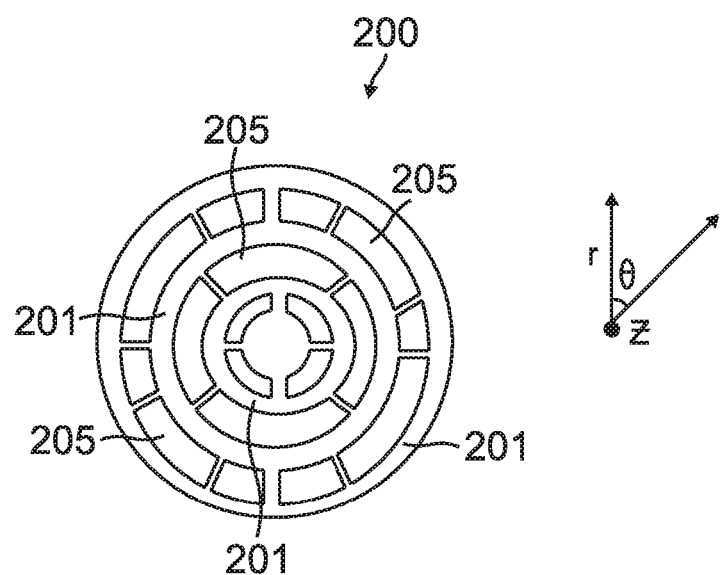

In exemplary embodiments, an anisotropic structure with strong thermal conductivity in the z-direction is fabricated by layering a collection of sparsely connected and nested tubes along the z-axis such that thermal conductivity in the z-direction is stronger than in the r and θ directions (see FIG. 2B). FIG. 2B is a top view of an exemplary embodiment of region 200 included in a probe tip 100 comprised of sparsely connected and nested tubes 201 as viewed through the z-axis. As shown in FIG. 2B, tubes 201 are arranged with voids 205 such that heat from heat source 115 is directed through the z-axis but not along a radial direction of tubes 201. Thus, in the example shown in FIG. 2B, the process of layering is used to fabricate probe tip 100*a* such that region 101*a* has insulating thermal properties and region 105*a* has high thermal conductivity in the z-direction.

Probe 100*a* can be sectioned into more than two regions such that each region is configured to have thermal characteristics that further enhance the flow of heat from heat source 115 to front tip area 110. In the example shown in FIG. 1B, probe tip 100 is sectioned into five regions 101, 102, 103, 104 and 105. In exemplary embodiments, regions 101-105 extend 360 degree around the z-axis 120 and are axially symmetric. In the example shown in FIG. 1B, each region has different thermal material properties. In exemplary embodiments, regions 101-105 are configured such that overall thermal conductivity of the probe tip in the z-direction is greater than thermal conductivity in radial direction r and tangential direction θ. In the example of FIG. 1, the thermal conductivity of these regions is defined using a radial (r, θ, z) coordinate system 150, and z-direction is parallel to the z-axis 120 along which probe tip 100 is extended.

In the example shown in FIG. 1B, region 101 is adjacent to the heating coil 115 and region 105 included in front end tip area 110. Region 101 is configured to function as a thermal reservoir that stores heat from heating coil 115, which can be accessed by region 105. Accordingly, region 101 has high thermal conductivity κ and is configured to have uniform thermal characteristics in all directions such that thermal conductivity $\kappa_z$ in z-direction is equal to thermal conductivity $\kappa_r$ in r-direction and $\kappa_\theta$ in θ-direction.

In the example shown in FIG. 1B, region 103 is adjacent to region 101 and heating coil 115 and away from the front end tip area 110. When heating coil 115 is fully powered, region 103 receives maximum heat that could result in hot spots around region 103. To prevent excessive heat from disseminating through the probe, region 103 is configured to function as an insulator with isotropic properties. Accordingly, thermal conductivity $\kappa_z$ in z-direction is equal to thermal conductivity $\kappa_r$ in r-direction and $\kappa_\theta$ in θ-direction but significantly less than the thermal conductivity in region 101. In some embodiments, the thermal conductivity is not uniform in all directions.

In the example shown in FIG. 1B, region 104 is hard abrasion resistant outer skin of probe tip 100. Region 104 functions as a protective cover for probe tip 100 and is composed of a dense material having uniform thermal characteristics in all directions. In exemplary embodiments, region 104 functions with minimal thermal conductivity in the z-direction, the r-direction, and the θ-direction.

In the example shown in FIG. 1B, region 105 is included in front end tip area 110 and is adjacent to hole 125. Hole 125 is critical for pitot probe to have access to incoming fluid media (such as air) and measure its pressure. Region 105 functions as a thermal wick that allows heat to be conducted from region 101 to the end of the tip in the z-direction. Accordingly, region 105 is configured to have thermal characteristics such that thermal conductivity $\kappa_z$ in z-direction is significantly higher than thermal conductivity $\kappa_r$ in r-direction and $\kappa_\theta$ in θ-direction.

In exemplary embodiments, an additional region that functions as a weak insulator is included in probe tip 100. In the example shown in FIG. 1B, region 102 is configured to function as a weak insulator situated along the inner edge of the probe tip 100. In exemplary embodiments, region 102 is configured to function as a mild anisotropic insulator. Region 102 is adjacent to regions 101, 103, 104 and 105, and hole 125. In the example shown in FIG. 1B, region 104 acts as a protective layer and can have lower thermal conductivity values than region 105 to allow the thermal energy to conduct along region 105 towards the probe tip. Accordingly, region 102 is configured to have lower thermal conductivity in the r and θ direction than in z-direction. Thermal conductivity in the r and θ direction is also less than thermal conductivity in region 101.

Regions 101-105 can be composed of materials including but not limited to copper alloy, nickel alloy, stainless steel, aluminum, etc. or a combination thereof. In exemplary embodiments, at least one of the at least two regions 101-105 included in probe tip 100 is formed using different materials through subtractive manufacturing such that the material inherently has thermal characteristics as desired by probe tip 100 to enhance the heat conducted in front end tip area 110. For example, region 105 is configured to have thermal conductivity that is significantly higher in at least the z-direction than thermal conductivity of the surrounding material. Accordingly, region 105 can be fabricated using a material different from the material used to fabricate regions 101 and 102. In such an example, region 105 would be fabricated using a material having a higher thermal conductivity than the materials used to fabricate surrounding regions 101 and 102.

In exemplary embodiments, at least one of the at least two regions 101-105 included in probe tip 100 is formed through the process of additive manufacturing (such as electron beam melting (EBM), direct metal laser sintering (DMLS), etc.). In exemplary embodiments, through knowledge of the properties of grain growth and grain orientation of certain materials, probe tip 100 is fabricated with specific designed-in features that produce different thermal characteristics to enhance the flow of heat from the heat source to the probe tip area. As described with respect to FIG. 1A, in exemplary embodiments, a single material can be used to fabricate multiple regions of the at least two regions included in probe tip 100 through the process of additive manufacturing.

In exemplary embodiments, different materials can be used in an additive manufacturing process to fabricate different regions of the at least two regions 101-105. For example, region 101 can be fabricated by growing or depositing nickel alloy grains with a preferred grain growth and orientation across multiple grains of nickel alloy, whereas region 105 can be fabricated by growing or depositing copper alloy grains with a preferred grain growth and orientation across multiple grains of copper alloy. In exemplary embodiments, each region of the at least two regions 101-105 is fabricated from a different material. In such an example, region 101, which has high uniform thermal conductivity in all directions, is fabricated using a material different from region 103, which has high uniform non-conductivity in all directions. Further, region 105 can be fabricated using a single material that inherently has the desired directional thermal characteristics by growing or depositing the material with a preferred grain growth and orientation across multiple grains.

In exemplary embodiments, regions of the at least two regions 101-105 are fabricated using a single material. In exemplary embodiments, a highly conductive material (such as copper alloy or nickel alloy) is used to fabricate probe tip 100. In exemplary embodiments, voids are introduced in the conductive material to create a strong insulator or to direct heat received from heat source 115 in a desired direction. In one example of such an embodiment, a strong insulator (for example region 103) is fabricated by introducing voids in a uniformly built material (see FIG. 2A). As shown in FIG. 2A, voids 225 are introduced in material 221 to fabricate an insulating material 220. In exemplary embodiments, these voids can be introduced in the highly conductive material used for fabrication through the process of additive manufacturing.

In exemplary embodiments, an anisotropic structure with strong thermal conductivity in the z-direction is fabricated by layering a collection of sparsely connected and nested tubes along the z-axis such that thermal conductivity in the z-direction is stronger than in the r and θ directions (see FIG. 2B). FIG. 2B is a top view of an exemplary embodiment of region 200 included in a probe tip 100 comprised of sparsely connected and nested tubes 201 as viewed through the z-axis. As shown in FIG. 2B, tubes 201 are arranged with voids 205 such that heat from heat source 115 is directed through the z-axis but not along a radial direction of tubes 201.

In exemplary embodiments, a combination of the above described processes can be used to fabricate regions of the at least two regions of the probe tip described in FIGS. 1A and 1B. For example, using the process of subtractive manufacturing, region 103 may be fabricated from a uniform insulating material. Using the process of additive manufacturing, region 101 configured to have uniform thermal conductivity and region 102 configured to function as a weak insulator may be fabricated using a single copper alloy by introducing voids inside the copper material to provide region 102 with insulating characteristics. Further, region 105 can be fabricated by using the process of layering to enhance the heat flow toward the front end of the tip.

In some embodiments, probe tip 100 is detachable from rest of the pitot probe assembly. In exemplary embodiments, the detachable probe tip 100 is attached to the probe through a brazing process. FIGS. 3A-3B illustrate an exemplary process of rapid restoration or replacement of probe tip 100. In the example shown in FIG. 3A-3B, a probe tip 100 with anisotropic thermal material properties having at least one of the regions 101-105 with desired thermal characteristics is formed using at least one of the manufacturing processes described herein. The resulting probe tip includes a pocket 178 such that when attached with probe 180, pocket 178 surrounds the tip of heating coil 115. The pocket 178 could be filled with braze filler 175. After brazing and attaching probe tip 100 to the rest of probe 180, probe tip 100 is placed in a fixture 170 to align the probe tip to a central axis 120 of probe 180. In FIGS. 1A-1B, the central axis 120 is the z-axis 120 along which heat source 115 is extended. In exemplary embodiments, machining operations may be performed to remove excess material in probe tip 100.

Figure 4:
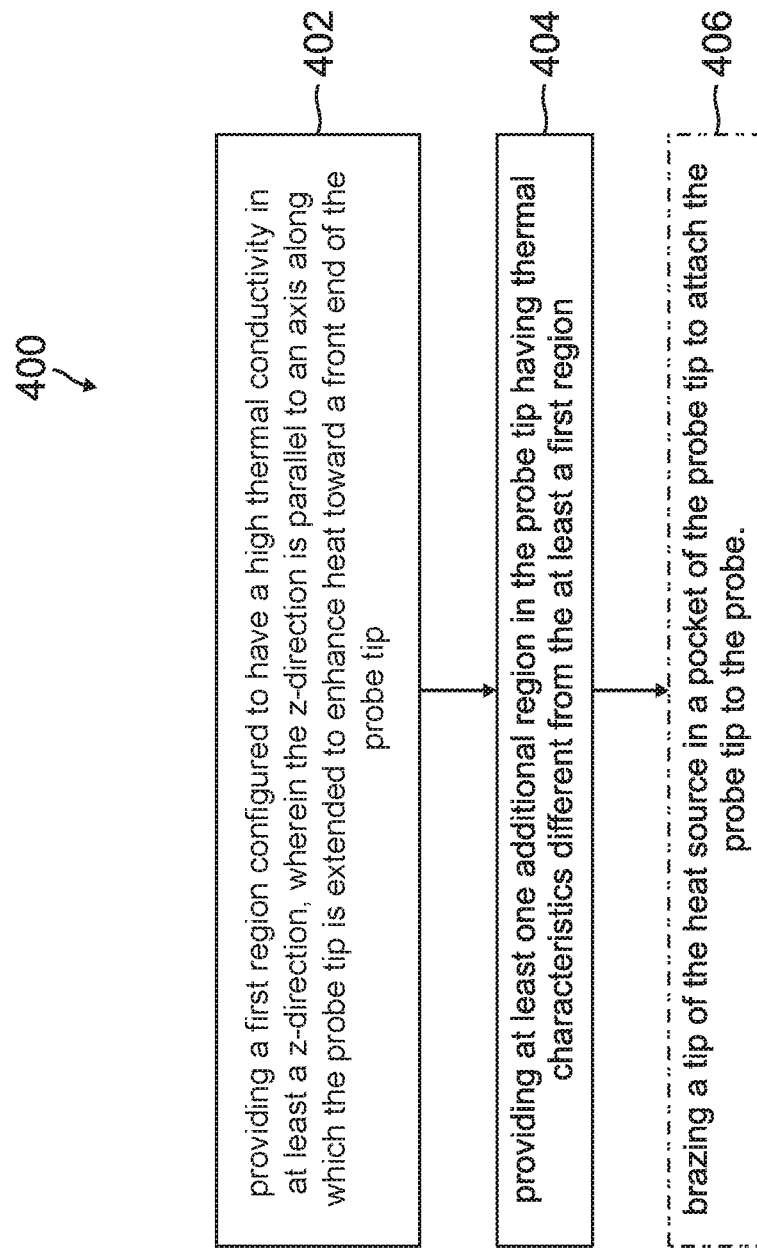
FIG. 4 illustrates a method of managing heat input of a probe assembly according to one embodiment of the present disclosure.

FIG. 4 is a flow diagram showing an exemplary method 400 of managing heat input of a probe. Method 400 enhances the flow of heat into a front end tip area of probe tip of the probe. As discussed herein, the method 400 is described with respect to examples of probe assembly shown in FIGS. 1-3B. However, method 400 may apply to other examples of a probe assembly as well.

Method 400 begins at block 402 with providing a first region configured to have a high thermal conductivity in at least a z-direction, wherein the z-direction is parallel to an axis along which the probe tip is extended to enhance heat toward a front end of the probe tip.

Method 400 proceeds to block 404 with providing at least one additional region in the probe tip having thermal characteristics different from the first region. In exemplary embodiments, providing at least one additional region in the probe tip further comprises providing a second region in the probe tip configured to function as a thermal reservoir with uniform thermal conductivity in all directions. In exemplary embodiments, providing at least one additional region further comprises providing a third region configured to function as an insulator in all directions. In exemplary embodiments, providing at least one additional region in the probe tip further comprises providing a fourth region configured to function as a mild anisotropic insulator having thermal conductivity in the z-direction and approximately no conductivity in other directions, wherein the thermal conductivity of the fourth region in z-direction is less than the thermal conductivity of the second region.

In exemplary embodiments of method 400, at least one of the first, second, third or fourth regions is fabricating using a process of additive manufacturing. In exemplary embodiments, using a process of additive manufacturing further comprises utilizing direct metal laser sintering. In exemplary embodiments, using a process of additive manufacturing further comprises utilizing electron beam melting.

In exemplary embodiments, method 400 comprises layering a collection of sparsely connected and nested tubes along an axis in the z-direction such that heat is directed in z-direction, wherein the tubes are composed of a material having uniform thermal conductivity in all directions. In exemplary embodiments, method 400 comprises providing voids in a material having uniform thermal conductivity in all directions. In exemplary embodiments, method 400 ends with an optional step at block 406 with brazing a tip of the heat source in a pocket of the probe tip to attach the probe tip to the probe.

Example Embodiments

Example 1 includes a probe assembly comprises: a heat source; and a probe tip configured to enhance conduction of heat provided by the heat source into a front end tip of the probe, the probe tip including: a first region having high thermal conductivity in at least a z-direction, wherein the z-direction is parallel to an axis along which the probe tip is extended; and at least one additional region having thermal characteristics different from the first region.

Example 2 includes the probe assembly of Example 1, wherein one of the at least one additional region is configured to function as a thermal reservoir with uniform thermal conductivity in all directions.

Example 3 includes the probe assembly of any of Examples 1-2, wherein one of the at least one additional region is configured to function as an insulator in all directions.

Example 4 includes the probe assembly of any of Examples 1-3, wherein one of the at least one additional region is configured to function as a weak insulator having thermal conductivity in the z-direction and approximately no conductivity in other directions.

Example 5 includes the probe assembly of any of Examples 1-4, wherein one of the at least one additional region is a outer skin region having uniform thermal conductivity in all directions, and wherein the outer skin region is a protective outer skin of the probe tip composed of a dense abrasion resistant material.

Example 6 includes the probe assembly of any of Examples 1-5, wherein the probe tip includes a single conductive material having uniform thermal characteristics.

Example 7 includes the probe assembly of Example 6, further comprising voids in the conductive material to direct the heat provided by the heat source in a desired direction.

Example 8 includes the probe assembly of any of Examples 1-7, wherein the probe tip is replaceable.

Example 9 includes the probe assembly of any of Examples 1-8, wherein the first region is configured to have thermal conductivity in other directions lower than thermal conductivity in the z-direction.

Example 10 includes the probe assembly of any of Examples 1-9, wherein the probe tip includes a collection of sparsely connected and nested tubes layered along an axis in the z-direction such that heat is directed in z-direction, wherein the tubes are composed of a material having uniform thermal conductivity in all directions.

Example 11 includes a method of fabricating a probe tip for a probe, the method comprising: providing a first region configured to have a high thermal conductivity in at least a z-direction, wherein the z-direction is parallel to an axis along which the probe tip is extended to enhance heat toward a front end of the probe tip; and providing at least one additional region in the probe tip having thermal characteristics different from the first region.

Example 12 includes the method of Example 11, wherein providing an additional region further comprises at least one of: providing a second region configured to function as a thermal reservoir with uniform thermal conductivity in all directions; providing a third region configured to function as an insulator in all directions; and providing a fourth region configured to function as a weak insulator having thermal conductivity in the z-direction and approximately no conductivity in other directions, wherein the thermal conductivity of the fourth region in the z-direction is less than the thermal conductivity of the second region.

Example 13 includes the method of any of Examples 11-12, further comprising brazing a tip of the heat source in a pocket of the probe tip to attach the probe tip to the probe.

Example 14 includes the method of any of Examples 11-13, further comprising providing voids in a material having uniform thermal conductivity in all directions.

Example 15 includes the method of any of Examples 11-14, further comprising layering a collection of sparsely connected and nested tubes along an axis in the z-direction such that the heat is directed in the z-direction, wherein the tubes are composed of a material having uniform thermal conductivity in all directions.

Example 16 includes the method of any of Examples 11-15, wherein providing at least one of the at least one region and the at least one additional region further comprises fabricating at least one of the at least one region and the at least one additional region using a process of additive manufacturing.

Example 17 includes the method of Example 16, wherein using a process of additive manufacturing further comprises utilizing direct metal laser sintering.

Example 18 includes the method of any of Examples 16-17, wherein using a process of additive manufacturing further comprises utilizing electron beam melting.

Example 19 includes a probe tip comprises: a first region having high thermal conductivity in a z-direction, wherein the z-direction is parallel to an axis along which the probe tip is extended, and wherein the first region has lower thermal conductivity in other directions; a second region configured to function as a thermal reservoir with uniform thermal conductivity in all directions; a third region configured to function as an insulator in all directions; and a fourth region configured to function as a mild anisotropic insulator having thermal conductivity in the z-direction and approximately no conductivity in other directions, wherein the thermal conductivity of the fourth region in z-direction is less than the thermal conductivity of the second region.

Example 20 includes the probe tip of Example 19, wherein the probe tip includes a copper alloy or a nickel alloy.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A probe assembly comprises:
   a heat source; and
   a probe tip configured to enhance conduction of heat provided by the heat source into a front end tip of the probe, the probe tip including:
      a first region having higher thermal conductivity in a z-direction than thermal conductivity in other directions, wherein the z-direction is parallel to an axis along which the probe tip is extended; and
      a second region configured to function as a thermal reservoir with uniform thermal conductivity in all directions.

2. The probe assembly of claim 1, further comprising a third region that is configured to function as an insulator in all directions.

3. The probe assembly of claim 1, further comprising a fourth region configured to function as a weak insulator having thermal conductivity in the z-direction and approximately no conductivity in other directions.

4. The probe tip of claim 3, wherein the thermal conductivity of the fourth region in z-direction is less than the thermal conductivity of the second region.

5. The probe assembly of claim 1, further comprising an outer skin region having uniform thermal conductivity in all directions, and wherein the outer skin region is a protective outer skin of the probe tip composed of a dense abrasion resistant material.

6. The probe assembly of claim 1, wherein the probe tip includes a single conductive material having uniform thermal characteristics.

7. The probe assembly of claim 6, further comprising voids in the conductive material to direct the heat provided by the heat source in a desired direction.

8. The probe assembly of claim 1, wherein the probe tip is replaceable.

9. The probe assembly of claim 1, wherein the first region is configured to have thermal conductivity in other directions lower than thermal conductivity in the z-direction.

10. The probe tip of claim 1, wherein the probe tip includes a copper alloy or nickel alloy.

11. The probe tip of claim 1, wherein the probe tip includes a layered collection of sparsely connected and nested tubes along an axis in the z-direction such that the heat is directed in the z-direction.

12. The probe tip of claim 11, wherein the sparsely connected and nested tubes are composed of a material having uniform thermal conductivity in all directions.

* * * * *